(12) United States Patent
Sato et al.

(10) Patent No.: US 9,471,424 B2
(45) Date of Patent: Oct. 18, 2016

(54) INFORMATION PROCESSING DEVICE AND METHOD, AND RECORDING MEDIUM

(75) Inventors: Kazumi Sato, Tokyo (JP); Tomohiro Katori, Tokyo (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 14/235,110

(22) PCT Filed: Aug. 21, 2012

(86) PCT No.: PCT/JP2012/071027
§ 371 (c)(1),
(2), (4) Date: Jan. 27, 2014

(87) PCT Pub. No.: WO2013/031572
PCT Pub. Date: Mar. 7, 2013

(65) Prior Publication Data
US 2014/0201601 A1    Jul. 17, 2014

(30) Foreign Application Priority Data

Aug. 30, 2011 (JP) .................................. 2011-187274

(51) Int. Cl.
| G11C 29/00 | (2006.01) |
| G06F 11/10 | (2006.01) |
| G06F 11/14 | (2006.01) |
| G06F 11/00 | (2006.01) |
| G06F 3/06 | (2006.01) |

(52) U.S. Cl.
CPC ......... *G06F 11/1072* (2013.01); *G06F 3/0619* (2013.01); *G06F 3/0652* (2013.01); *G06F 3/0679* (2013.01); *G06F 11/008* (2013.01); *G06F 11/1068* (2013.01); *G06F 11/1415* (2013.01)

(58) Field of Classification Search
None
See application file for complete search history.

(56) References Cited

U.S. PATENT DOCUMENTS

| 6,625,755 B1 * | 9/2003 | Hirata et al. ................. 714/17 |
| 2003/0088813 A1 * | 5/2003 | McClellan et al. ............. 714/42 |
| 2004/0255080 A1 | 12/2004 | Kihara et al. |

(Continued)

FOREIGN PATENT DOCUMENTS

| EP | 1001342 A2 | 11/1999 |
| JP | 2000-148604 | 5/2000 |

(Continued)

OTHER PUBLICATIONS

Aug. 4, 2015, Japanese Office Action for related JP application No. 2011-187274.

(Continued)

*Primary Examiner* — Daniel McMahon
(74) *Attorney, Agent, or Firm* — Paratus Law Group, PLLC

(57) ABSTRACT

The present technology relates to an information processing device and method, and a recording medium, which make it possible for a data recording system and so forth to be optimized in accordance with use. Provided are: a recording system decision unit that, on the basis of characteristics which are characteristics of data to be recorded in a recording medium, and include a lifespan value representing the retention period of the data and an error rate representing the percentage of errors assumed to be generated when the data is read, generates a plurality of recording regions of a logical device configured from the recording medium, and also decides recording systems to be applied in each of the recording regions; and a logical device initialization unit that initializes each of the recording regions of the logical device on the basis of the decided recording systems.

11 Claims, 10 Drawing Sheets

(56) References Cited

U.S. PATENT DOCUMENTS

| | | | |
|---|---|---|---|
| 2008/0126680 A1 | 5/2008 | Lee et al. | |
| 2008/0183966 A1* | 7/2008 | Shim | G11C 16/3495 711/115 |
| 2008/0198651 A1* | 8/2008 | Kim | 365/185.03 |
| 2009/0116349 A1* | 5/2009 | Takashima | 369/47.1 |
| 2009/0228655 A1* | 9/2009 | Yamane | G06F 3/0611 711/117 |
| 2009/0259799 A1 | 10/2009 | Wong | |
| 2010/0199020 A1 | 8/2010 | Lin et al. | |
| 2011/0040932 A1* | 2/2011 | Frost et al. | 711/103 |
| 2011/0176399 A1* | 7/2011 | Yorimoto | 369/30.03 |

FOREIGN PATENT DOCUMENTS

| | | |
|---|---|---|
| JP | 2003-091463 | 3/2003 |
| JP | 2003-216508 | 7/2003 |
| JP | 2005-301684 | 10/2005 |
| JP | 2007-115232 | 10/2007 |
| JP | 2009-537055 | 10/2009 |
| JP | 2010-518546 | 5/2010 |
| JP | 2010-198407 | 9/2010 |
| WO | WO2009/090731 | 7/2009 |

OTHER PUBLICATIONS

Feb. 16, 2016, Japanese Office Action for related JP Application No. 2011-187274.

Dec. 1, 2015, Chinese Office Action for related CN Application No. 2015112601263240.

May 4, 2016, European Search Report for related EP Application No. 12827588.0.

* cited by examiner

FIG. 2

| | SECURING PRIORITY | REQUIRED REGION | REWRITE COUNT | WRITE DATA AMOUNT | LIFESPAN/ERROR RATE | READ SPEED | WRITE SPEED |
|---|---|---|---|---|---|---|---|
| (1) FS METADATA | 1 | SEVERAL TENS OF MB (SMALL) | MANY TIMES | METADATA AMOUNT × TOTAL WRITE COUNT | 10 YEARS/ERRORS NOT POSSIBLE | FAST | FAST |
| (2) PROGRAM | 2 | SEVERAL HUNDRED MB (MEDIUM) | A FEW TIMES | PROGRAM TOTAL AMOUNT | 10 YEARS/ERRORS NOT POSSIBLE | AS FAST AS POSSIBLE | AS FAST AS POSSIBLE |
| (3) WORK FILE | 3 | SEVERAL TENS OF MB (SMALL) | MANY TIMES | WORK FILE DATA TOTAL WRITE AMOUNT | 10 YEARS/ERRORS NOT POSSIBLE | AS FAST AS POSSIBLE | AS FAST AS POSSIBLE |
| (4) STILL IMAGE | 6 | SEVERAL GB (LARGE) | ONCE | TOTAL NUMBER OF IMAGES | 3 YEARS/ERRORS NOT POSSIBLE | FROM THUMBNAIL AND DISPLAY SPECIFICATIONS | CONTINUOUS SHOOTING SPEED |
| (5) MOVIES, MUSIC, PREDETERMINED METADATA | 6 | SEVERAL GB (LARGE) | ONCE | TOTAL DATA AMOUNT OVER PRODUCT LIFESPAN | 3 YEARS/ERRORS NOT POSSIBLE | FROM BIT RATE, TAKING INTO CONSIDERATION N-TIMES REPRODUCTION SPEED | FROM BIT RATE, TAKING INTO CONSIDERATION N-TIMES REPRODUCTION SPEED |
| (6) CORRECTED MOVIE DATA, AMENDABLE DATA | 6 | SEVERAL GB (LARGE) | ONCE | TOTAL DATA AMOUNT OVER PRODUCT LIFESPAN | 3 YEARS/ERRORS POSSIBLE | BIT RATE + CORRECTION PERFORMANCE, TAKING INTO CONSIDERATION N-TIMES REPRODUCTION SPEED | BIT RATE + CORRECTION PERFORMANCE, TAKING INTO CONSIDERATION N-TIMES REPRODUCTION SPEED |
| (7) POWER-OFF STATE STORAGE FILE | 4 | SEVERAL TENS OF MB (SMALL) | EVERY TIME POWER IS TURNED OFF | SMALL AMOUNT | 1 YEAR/ERRORS POSSIBLE | AS FAST AS POSSIBLE | AS FAST AS POSSIBLE |
| (8) CACHE DATA | 5 | SEVERAL HUNDRED MB (MEDIUM) | MANY TIMES | TOTAL PAGE VIEWING DATA AMOUNT | 1 YEAR/ERRORS POSSIBLE | AS FAST AS POSSIBLE | AS FAST AS POSSIBLE |

INFORMATION PROCESSING DEVICE AND METHOD, AND RECORDING MEDIUM

CROSS REFERENCE TO PRIOR APPLICATION

This application is a National Stage Patent Application of PCT International Patent Application No. PCT/JP2012/071027 (filed on Aug. 21, 2012) under 35 U.S.C. §371, which claims priority to Japanese Patent Application No. 2011-187274 (filed on Aug. 30, 2011), which are all hereby incorporated by reference in their entirety.

TECHNICAL FIELD

The present technology relates to an information processing device and method, and a recording medium, and particularly relates to an information processing device and method, and a recording medium, which make it possible for a data recording system and so forth to be optimized in accordance with use.

BACKGROUND ART

In recent years, the physical capacity of storage has been increasing due to refinement and densification; however, error rates have been increasing with the increase in capacity, and the lifespan of storage is becoming shorter. In order to compensate for this, for example, it is necessary to take countermeasures such as error correction and redundancy, and it is becoming difficult to increase the capacity that can actually be used.

Furthermore, in conventional storage, when reading or writing, it is not possible to know what kinds of data are going to be read or written and to what extent these are going to be read or written, and it is therefore necessary to take the worst values for all cases into consideration in the design concerning performance and quality assurance and so forth.

Furthermore, a technology has also been proposed that uses both the two systems of the MLC system and the SLC system as systems for recording data, and also changes the recording system in accordance with the type of recording data, such as whether or not the recording data is file system data (for example, see Patent Document 1). An SLC (single-level cell) is a system for recording 1 bit of data in one cell, and an MLC (multi-level cell) is a system for recording a plurality of bits of data in one cell. In this case, the SLC system is employed in portions having a high update frequency such as the FAT. Thus, it is possible to realize an increase in recording capacity, and to prolong the memory lifespan.

In addition, mixing storage devices that have a low power consumption but also have a low write performance and a short device lifespan, suitably controlling those plurality of storage hierarchies, allocating the storage hierarchies corresponding to a policy designated with respect to the attributes and volume of data, and thereby realizing storage having low power consumption and little decline in performance has also been proposed (for example, see Patent Document 2). In this technology, parameters that affect lifespan, such as the number of times writing is performed to a device and the number of times erasing is performed, and the power consumption in devices are managed, and the transition between the storage hierarchies is suitably controlled.

CITATION LIST

Patent Documents

Patent Document 1: JP 2010-198407 A
Patent Document 2: JP 2007-115232 A

DISCLOSURE OF INVENTION

Problems to be Solved by the Invention

However, in recent years, smartphones have also become widespread in addition to electronic devices such as digital cameras and portable audio players, and expanding the storage capacity in these electronic devices has become an increasingly important issue in recent years.

Although further ingenuity is therefore required, for example, in the technology of Patent Document 1, only the update frequency is taken into consideration when the recording system is selected. Furthermore, the technology of Patent Document 2 assumes that a HDD and nonvolatile memory are combined, and the application scope is restricted. Furthermore, error tolerance and lifespan are not taken into consideration.

The present technology is disclosed taking such circumstances into consideration, and optimizes a recording system and so forth for data in accordance with use.

Solutions to Problems

A first aspect of the present technology is an information processing device including: a recording system decision unit that, on the basis of characteristics of data to be recorded in a recording medium, generates a plurality of recording regions of a logical device configured from the recording medium, and also decides recording systems to be applied in each of the recording regions; and a logical device initialization unit that initializes each of the recording regions of the logical device on the basis of the decided recording systems.

It is possible for the characteristics of the data recorded in the recording medium to be characteristics including a lifespan value representing the retention period of the data and an error rate representing the percentage of errors assumed to be generated when the data is read.

It is possible for the recording system decision unit to decide parameters which are parameters for designating recording systems to be applied in each of the recording regions, and include an identifier that distinguishes between SLC/MLC, the error correction capability strength, and the degree of write leveling redundancy.

It is possible for the recording system decision unit to generate at least one recording region for recording data for which the error rate is a value exceeding 0.

It is possible for the logical device initialization unit to initialize at least one recording region in which a recording system of the SLC (single-level cell) system is to be applied, as a region for recording the metadata of a file system.

An aspect of the present technology is an information processing method including steps in which: a recording system decision unit generates, on the basis of characteristics of data to be recorded in a recording medium, a plurality of recording regions of a logical device configured from the recording medium, and also decides recording systems to be applied in each of the recording regions; and a logical device initialization unit initializes each of the recording regions of the logical device on the basis of the decided recording systems.

An aspect of the present technology is a recording medium having recorded thereon a program that causes a computer to function as an information processing device including: a recording system decision unit that, on the basis of characteristics of data to be recorded in a recording medium, generates a plurality of recording regions of a logical device configured from the recording medium, and also decides recording systems to be applied in each of the recording regions; and a logical device initialization unit that initializes each of the recording regions of the logical device on the basis of the decided recording systems.

In the first aspect of the present technology, on the basis of the characteristics of data to be recorded in a recording medium, a plurality of recording regions of a logical device configured from a recording medium are generated, and also recording systems to be applied in each of the recording regions are decided, and each of the recording regions of the logical device are initialized on the basis of the decided recording systems.

A second aspect of the present technology is an information processing device including: a recording system decision unit that, on the basis of characteristics which are characteristics of data to be recorded in a recording medium, and include a lifespan value representing the retention period of the data and an error rate representing the percentage of errors assumed to be generated when the data is read, decides a system for recording the data to the recording medium; and a recording execution unit that records the data in a recording region corresponding to the decided recording system, from among a plurality of recording regions of recording regions of the logical device.

In the second aspect of the present technology, on the basis of characteristics which are characteristics of data to be recorded in a recording medium, and include a lifespan value representing the retention period of the data and an error rate representing the percentage of errors assumed to be generated when the data is read, a system for recording the data to the recording medium is decided, and the data is recorded in a recording region corresponding to the decided recording system, from among a plurality of recording regions of recording regions of the logical device.

A third aspect of the present technology is an information processing device including: a request determination unit that determines whether or not a read request for data recorded in a recording medium has been acquired together with information representing characteristics including an error rate representing the percentage of errors assumed to be generated when the data is read; a recording region designation unit that, in the case where it is determined that a read request for the data has been acquired, designates a recording region corresponding to characteristics of the data, from among a plurality of recording regions in the recording medium; a read unit that reads the data from the designated recording region; an error determination unit that determines whether or not there is an error in the data that has been read; a retry determination unit that, in the case where it is determined that there is an error in the data that has been read, determines whether or not the recording region from which the data has been read is a recording region for which a retry is necessary when the data is read; and a reread unit that, in the case where the data has been read from a recording region for which a retry is necessary, reads the data once again from the recording region.

In the third aspect of the present technology, it is determined whether or not a read request for data recorded in a recording medium has been acquired together with information representing characteristics including an error rate representing the percentage of errors assumed to be generated when the data is read. In the case where it is determined that a read request for the data has been acquired, a recording region corresponding to characteristics of the data is designated from among a plurality of recording regions in the recording medium. The data is read from the designated recording region, and it is determined whether or not there is an error in the data that has been read. In the case where it is determined that there is an error in the data that has been read, it is determined whether or not the recording region from which the data has been read is a recording region for which a retry is necessary when the data is read. In the case where the data has been read from a recording region for which a retry is necessary, the data is once again read from the recording region.

Effects of the Invention

According to the present technology, it is possible for a data recording system and so forth to be optimized in accordance with use.

BRIEF DESCRIPTION OF DRAWINGS

FIG. 2 is a drawing illustrating the types of data recorded in storage, and the characteristics corresponding to the types of data.

MODE FOR CARRYING OUT THE INVENTION

An embodiment of the technology disclosed herein is described hereafter with reference to the drawings.

Figure 1:
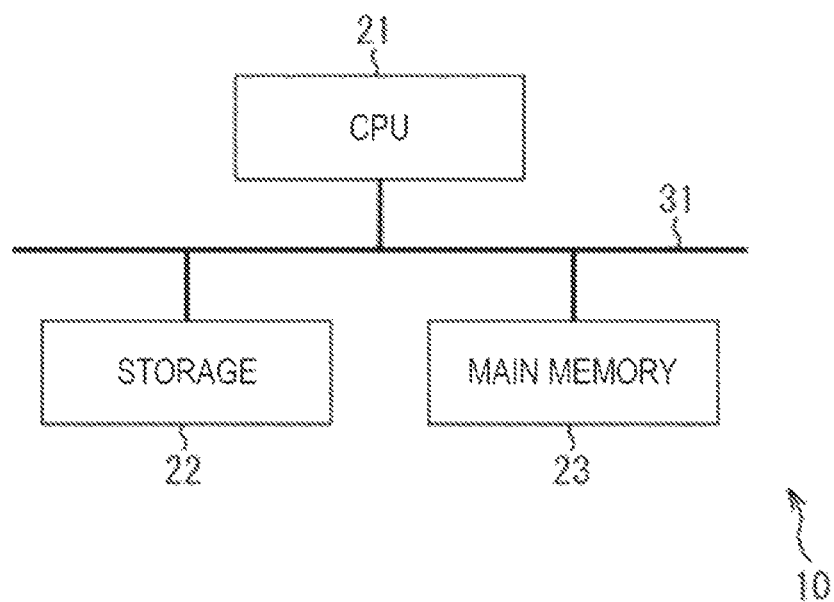
FIG. 1 is a block diagram depicting an exemplary configuration according to an embodiment of an electronic device in which the present technology has been applied.

FIG. 1 is a block diagram depicting an exemplary configuration according to an embodiment of an electronic device in which the present technology has been applied. In the example of the same drawing, in an electronic device 10, a CPU 21, storage 22, and main memory 23 are connected via a bus 31.

The electronic device 10 is, for example, configured as a digital camera or a music player and so forth, and is configured also having a function and so forth for connecting to a network as required. The storage 22, for example, is a logical device configured from a recording medium such as flash memory. For example, data of various types of application programs such as games and tools, data of images captured using a digital camera function of the electronic device 10, and data of music for being reproduced using a music player function, and so forth are recorded in the storage 22.

In the present technology, for example, recording systems for the data of the storage 22 are set in accordance with the types of the data that is recorded in the storage 22.

FIG. 2 is a drawing illustrating the types of data recorded in the storage 22, and the characteristics corresponding to the types of data. In FIG. 2, a table is given in which the types of data are depicted in the vertical direction in the drawing, and the characteristics of the data are depicted in the horizontal direction in the drawing.

Eight types of data from (1) to (8) are given in the example of FIG. 2. The first type of data is "FS (file system) metadata". This is metadata that is recorded as part of the data of a file system.

The second type of data is a "program". This, for example, is the data of various types of application programs such as games and tools that are executed in the electronic device 10.

The third type of data is a "work file". This, for example, is a file and so forth that is temporarily created in the storage 22, and is data that is erased after work has ended.

The fourth type of data is a "still image". This, for example, is data and so forth of a still image that has been captured using the digital camera function of the electronic device 10.

The fifth type of data is "movies, music, predetermined metadata". "Movies, music" are, for example, the data of movies and music and so forth encoded by means of the MPEG2 system, and are data that is not permitted to be amended during reproduction. "Predetermined metadata" is, for example, the metadata of the data of movies and music and so forth encoded by means of the MPEG4 system.

The sixth type of data is "corrected movie data, amendable data". "Corrected movie data" is, for example, data obtained by excluding the metadata of the data of movies and music and so forth encoded by means of the MPEG4 system. "Amendable data" is, for example, the data of movies and music and so forth encoded by means of the MPEG2 system, and is data that is permitted to be amended during reproduction.

The seventh type of data is a "power-off state storage file". This, for example, is data having written therein information and so forth to which reference is made when the power of the electronic device 10 is once again turned on after the power has been turned off.

The eighth type of data is "cache data". This, for example, temporarily stores viewed web pages, and stores data and so forth of EPGs (electronic program guides).

In the table of FIG. 2, seven types of headings are depicted as data characteristics. Namely, "securing priority", "required region", "rewrite count", "write data amount", "lifespan/error rate", "read speed", and "write speed" are depicted as data characteristics.

The "securing priority" is a value representing the priority for securing a region in which the data is to be recorded in the storage 22. In this example, priorities 1 to 6 have been set corresponding to the data types, and the lower the priority value is, the higher the priority becomes. When the recording region of the data is allocated in the storage 22, a recording region for data having a high priority (a low "securing priority" value) is preferentially allocated. For example, if the total of a required region described hereafter is greater than the total recording capacity of the storage 22, the required regions for data having a low priority are reduced.

The "required region" represents the recording capacity that should be allocated as a recording region for the data in question. For example, the sizes of the recording capacity that should be allocated as a recording region for the data are categorized into the three grades of "large", "medium" and "small", and are set with a predetermined required region as a numerical value.

The "rewrite count" is information representing to what extent the data is rewritten. In this example, the rewrite count of data is categorized into, in descending order, "many times", "every time power is turned off", "a few times" and "once". Predetermined numerical values are set, in accordance with these categories, as "rewrite counts".

The "write data amount" is information representing the total amount of the data that is written. For example, the total amount of each item of data that is written is assumed to be as depicted in the drawing, and, in practice, a predetermined numerical value is set.

The "lifespan/error rate" is information representing, in the case where the data has been recorded in the storage 22, the lifespan (retention period of the recording content) required for that recording region, and an error rate (the percentage of errors assumed to be generated when the data recorded in that recording region is read).

In this example, "10 years", "3 years", and "1 year" are set as "lifespans" corresponding to the data types. Furthermore, "errors not possible" and "errors possible" are set as "error rates" corresponding to the data types. Here, "errors not possible" means that the value of the error rate during the period of the lifespan set for that recording region is 0, and "errors possible" means that the value of the error rate during the period of the lifespan set for that recording region exceeds 0. Moreover, predetermined numerical values are set for the actual "lifespans" and "error rates".

The "read speed" is information representing the read speed required for the data in question. For example, the read speed for each item of data is assumed to be as depicted in the drawing, and, in practice, a predetermined numerical value is set.

The "write speed" is information representing the write speed required for the data in question. For example, the write speed for each item of data is assumed to be as depicted in the drawing, and, in practice, a predetermined numerical value is set.

Moreover, in the case where there is another type of data recorded in the storage 22, the seven types of headings are likewise written as characteristics also for that data.

Figure 3:
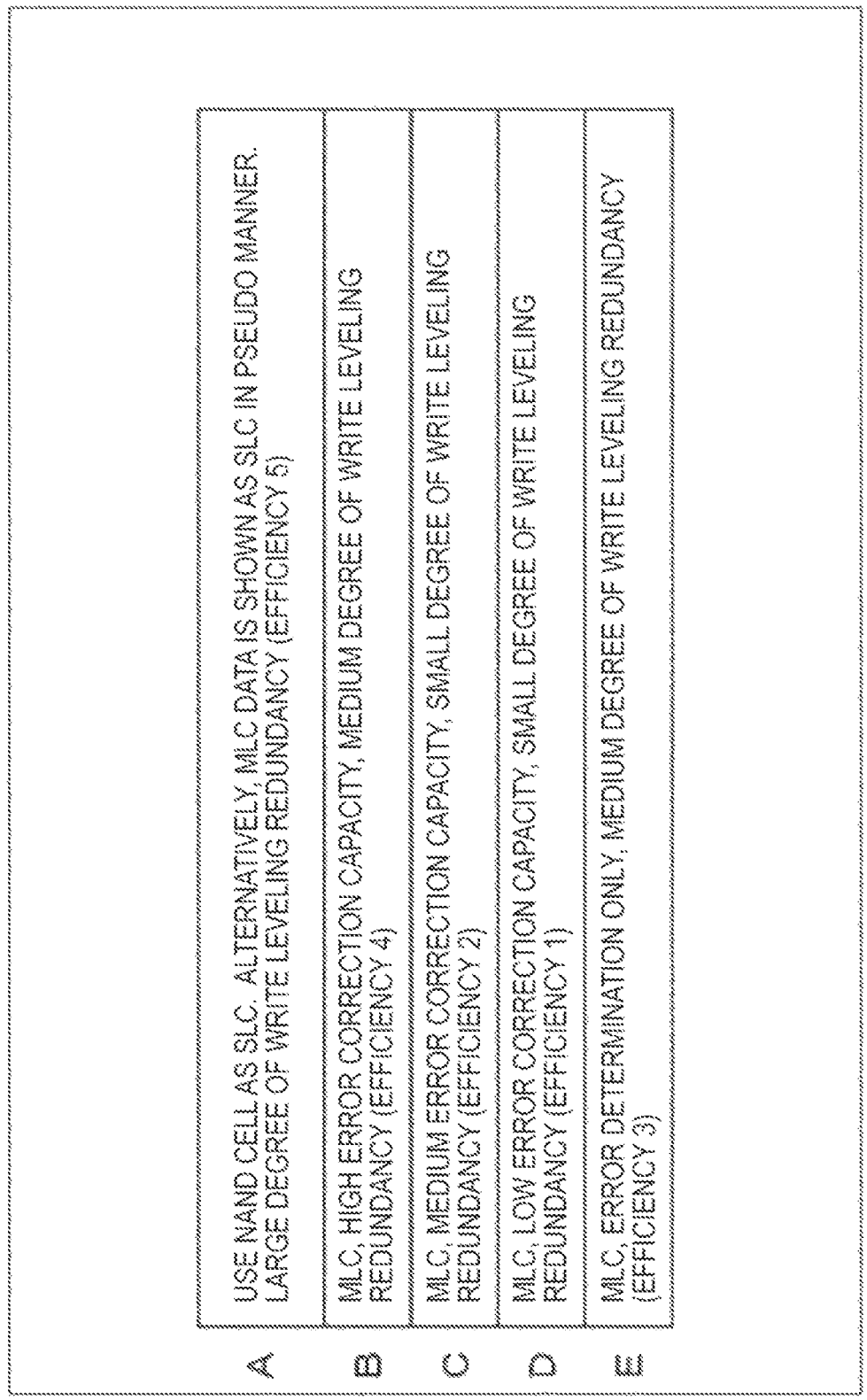
FIG. 3 is a drawing illustrating the categories of recording systems for storage.

In the present technology, for example, the recording systems of the storage 22 are categorized as depicted in FIG. 3, on the basis of the information of the table depicted in FIG. 2. FIG. 3 is a drawing illustrating the categories of the recording systems of the storage 22.

In the example of FIG. 3, the recording systems of the storage 22 are categorized into five recording systems A to E. The data recording efficiency (for example, recording capacity per unit area) in the recording system is depicted in the drawing by means of the (efficiency 5), (efficiency 4), . . . , (efficiency 1) indications. Here, the lower the numerical value following "efficiency" is, the higher the data recording efficiency becomes (for example, the recording capacity per unit area increases).

An SLC (single-level cell) in the same drawing is a system for recording 1 bit of data in one cell, and an MLC (multi-level cell) is a system for recording a plurality of bits of data in one cell. An MLC therefore has a larger recording capacity per unit area compared to an SLC.

Furthermore, in an SLC, since the detection of the amount of accumulated charge is judged by means of a binary H/L value, the generation of errors due to slight variations in the amount of accumulated charge such as cell deterioration or noise is suppressed. In an SLC, the upper-limit number of times that rewriting can be performed is high, and the data retention period is comparatively long.

However, in an MLC, since the detection of the amount of accumulated charge is judged by means of multiple values such as four values, eight values, and 16 values, and an error is generated if even a small fluctuation occurs in the amount of accumulated charge due to cell deterioration or noise. Generally, in an MLC, an error correction function is essential, and a large amount of redundant area is required compared to an SLC. Although an MLC is inferior compared to an SLC in terms of the number of times that writing can be performed and the data retention period, the recording capacity per one cell increases.

Furthermore, in the same drawing, in order to enhance the error correction capability, it is necessary to record a larger amount of redundancy code and so forth, and therefore the data recording efficiency decreases and read speed also declines. However, by enhancing the error correction capability, it becomes possible to suppress the generation of errors in data that is read.

In addition, in the same drawing, because a large value is set for the degree of write leveling redundancy, the data capacity that can actually be recorded is limited. However, by setting a large value for the degree of write leveling redundancy, it becomes possible to reduce the cell rewrite count and prolong the cell lifespan, and, furthermore, it becomes possible to suppress the generation of errors when reading and when rewriting data.

Recording system A is a system in which a NAND cell is used as an SLC, and, furthermore, MLC data is recorded as an SLC in a pseudo manner. Furthermore, in recording system A, the degree of write leveling redundancy is set to a large value.

Recording system A is a recording system with which, although the data recording efficiency is reduced (for example, recording capacity per unit area), the possibility of an error being generated is reduced to the utmost extent. For example, recording system A is applied in recording regions for data which has a high recording-region rewrite frequency, requires a low error rate, and requires the reading and writing of data to be performed at a high speed. Furthermore, a retry is not necessary in reading data of a recording region in which recording system A has been applied.

Moreover, the recording-region rewrite frequency, for example, can be designated on the basis of the "required region", the "rewrite count", and the "write data amount" of FIG. 2.

For example, recording system A is applied in the "FS (file system) metadata" and the "work file" recording regions of FIG. 2.

Recording system B employs MLC. Furthermore, in recording system B, redundancy code and so forth is set so that the error correction capability is enhanced, and the degree of write leveling redundancy is set to a large value.

Recording system B is a recording system in which the data recording efficiency is high, and the possibility of an error being generated is low compared to recording system A. For example, recording system B is applied in recording regions for data which has a low recording-region rewrite frequency, requires a low error rate, and requires the reading and writing of data to be performed at a high speed. Furthermore, a retry is not necessary in reading data of a recording region in which recording system B has been applied.

For example, recording system B is applied in the "program" recording region of FIG. 2.

Recording system C employs MLC. Furthermore, in recording system C, redundancy code and so forth is set so that the error correction capability is of an intermediate level, and the degree of write leveling redundancy is set to a small value.

Recording system C is a recording system with which, although the data recording efficiency is increased compared to recording system A and recording system B, the possibility of an error being generated is not reduced to a great extent. For example, recording system C is applied in recording regions for data which has a low recording-region rewrite frequency, requires a low error rate, and does not require the reading and writing of data to be performed at a very high speed. Furthermore, a retry is necessary in some cases in reading data of a recording region in which recording system C has been applied.

For example, recording system C is applied in the "still image" and "movies, music, predetermined metadata" recording regions of FIG. 2.

Recording system D employs MLC. Furthermore, in recording system D, redundancy code and so forth is set so that the error correction capability is low, and the degree of write leveling redundancy is set to a small value.

Recording system D is a recording system with which, although the possibility of an error being generated increases, the data recording efficiency is increased to the utmost extent. For example, recording system D is applied in recording regions for data which has a low recording-region rewrite frequency, does not require the error rate to be reduced, and does not require the reading and writing of data to be performed at a very high speed. Furthermore, a retry is necessary in some cases in reading data of a recording region in which recording system D has been applied.

For example, recording system D is applied in the "corrected movie data, amendable data" recording region of FIG. 2. These data items can be corrected or amended by an application program if there has been an error at the time of reading, and can therefore be recorded in a recording region implemented on the assumption that an error may occur when reading is performed. In other words, a recording region in which recording system D has been applied is a recording region implemented on the assumption that an error may occur when data is read.

Recording system E employs MLC. Furthermore, in recording system E, error correction capability is not required, redundancy code and so forth is set so that error determination is possible, and the degree of write leveling redundancy is set to an intermediate level value.

Recording system E is a recording system with which, although the possibility of an error being generated increases in comparison to recording system A and recording system B, the data recording efficiency is increased. For example, recording system E is applied in recording regions for data which has a high recording-region rewrite frequency, does not require the error rate to be reduced, and does not require the reading of data to be performed at a very high speed. Furthermore, a retry is necessary in some cases in reading data of a recording region in which recording system E has been applied.

In other words, as in the case of recording system D, recording system E permits the generation of errors to a certain extent when reading is performed; however, different from recording system D, the cell lifespan is prolonged, and also the generation of errors when reading is performed and when rewriting is performed is suppressed.

For example, recording system E is applied in the "power-off state storage file" and "cache data" recording regions of FIG. 2. These data items can be destroyed and processing can be continued if there has been an error at the time of reading, and can therefore be recorded in a recording region implemented on the assumption that an error may occur when reading is performed. In other words, a recording region in which recording system E has been applied is a recording region implemented on the assumption that an error may occur when data is read.

In the present technology, for example, a table such as that depicted in FIG. 2 is created in advance by the designer of the electronic device 10. Then, the recording system for the recording region of each item of data is decided on the basis of the characteristics of the types of data depicted in that table. In other words, since the designer of the electronic device 10 assumes what type of data is to be recorded in the storage 22 of the electronic device 10 when designing the electronic device 10, it is possible to create, in advance, a table such as that depicted in FIG. 2, for example.

In this way, in the present technology, characteristics corresponding to the type of data to be recorded are analyzed, and recording is performed using a plurality (for example, three types or more) of recording systems corresponding to that analysis result. For example, in conventional technology, since the error correction capability and the degree of write leveling redundancy are uniformly set, a high error correction capability and a large degree of write leveling redundancy are uniformly set also in the recording regions for the data of media content.

However, as depicted in FIG. 2, the "still images", the "movies, music, predetermined metadata", and the "corrected movie data, amendable data" have a low "rewrite count", and it is therefore understood that the recording-region rewrite frequency is low. Accordingly, it is not necessary to set a large degree of write leveling redundancy in the recording regions for the "still images", the "movies, music, predetermined metadata", and the "corrected movie data, amendable data".

Furthermore, as depicted in FIG. 3, it is understood that the "still images", the "movies, music, predetermined metadata", and the "corrected movie data, amendable data" have a short "lifespan". Furthermore, it is understood that the "corrected movie data, amendable data" may have an "error rate" of a value exceeding 0, as with the "power-off state storage file" and the "cache data". Accordingly, it is not necessary to set a high error correction capability in the recording regions for the "still images", the "movies, music, predetermined metadata", and the "corrected movie data, amendable data".

In addition, in conventional technology, recording regions such as those having an "error rate" of a value exceeding 0 were not generated in the "lifespan" period that is assumed to begin with. However, for example, as depicted in FIG. 2, by analyzing characteristics according to the type of data, in practice, it is understood that there are cases where there are no problems even if the "error rate" is a value exceeding 0 in the assumed "lifespan" period. Therefore, in the present technology, for example, recording regions are generated in which recording system D and recording system E of FIG. 3 are applied.

By applying the present technology in this way, for example, it is possible to increase the recording efficiency of the data of media content that requires a large capacity in storage such as a digital camera or an audio player.

Figure 4:
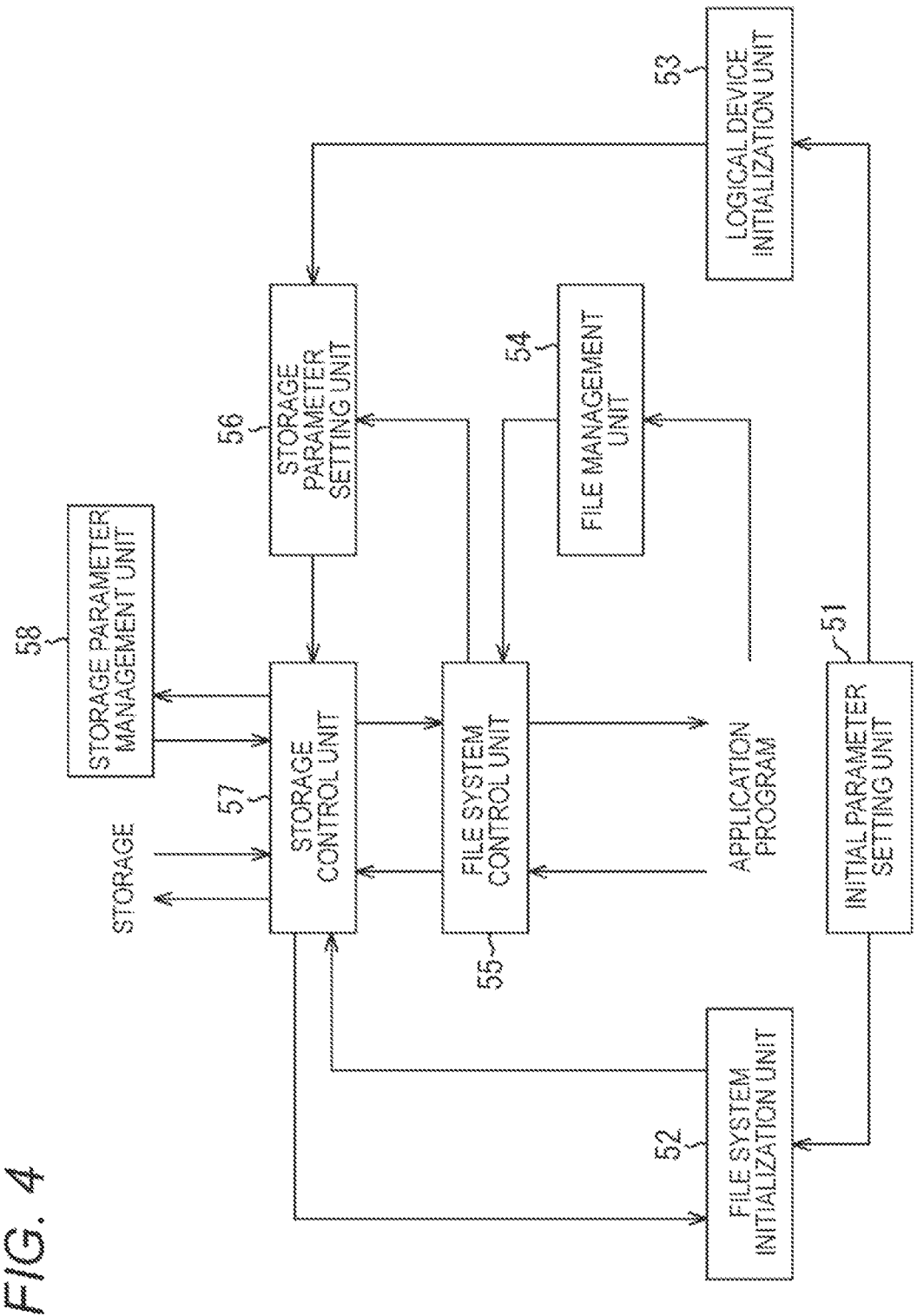
FIG. 4 is a block diagram depicting an exemplary functional configuration of software such as a program that is executed by the CPU of FIG. 1.

FIG. 4 is a block diagram depicting an exemplary functional configuration of software such as a program that is executed by the CPU 21 of FIG. 1, for example. It should be noted that, in the same drawing, only the functional block relating to the control of the recording of data to the storage 22 is depicted.

In the same drawing, an initial parameter setting unit 51, a file system initialization unit 52, a logical device initialization unit 53, a file management unit 54, a file system control unit 55, a storage parameter setting unit 56, a storage control unit 57, and a storage parameter management unit 58 are depicted.

The initial parameter setting unit 51, for example, sets the parameters for a plurality of recording systems (for example, recording system A to recording system E of FIG. 3) on the basis of the table of FIG. 2 created by the designer and so forth of the electronic device 10. Here, for example, the parameters are an identifier that distinguishes between SLC/MLC, the error correction capability strength, and the degree of write leveling redundancy and so forth.

The file system initialization unit 52 performs partitioning of the storage 22 on the basis of information such as the number of recording regions and the capacity of each recording region which is supplied from the initial parameter setting unit 51, and initializes a file system.

The logical device initialization unit 53 controls the initialization of each recording region of a logical device (for example, the storage 22) connected to the electronic device 10. At such time, for example, each recording region of the storage 22 is initialized, and a logical address/physical address conversion algorithm, an error correction system, and a degree of write leveling redundancy for each region are set by the storage control unit 57 described hereafter, on the basis of the parameters set by the initial parameter setting unit 51.

It should be noted that "write units" may be designated as a characteristic in the table depicted in FIG. 2. For example, it is possible for the optimum logical address/physical address conversion algorithm to be selected by taking into consideration pages and erasure blocks corresponding to data having high data write units, and pages and erasure blocks corresponding to data having low write units.

Furthermore, for example, information indicating whether data to be recorded is to be subjected to write-once writing or rewritable writing may be designated as a characteristic in the table depicted in FIG. 2. For example, if the write units of data are small, it is possible for the optimum logical address/physical address conversion algorithm to be selected in accordance with whether write-once writing or rewritable writing is to be performed.

The file management unit 54, for example, extracts data that is recorded in the storage 22 by an application program (a program such as a tool or game), and designates in which recording region each of those files should be recorded. Moreover, the write units (unit data amount at the time of write processing) of the data that is recorded are, for example, designated by means of a write request output from the application program.

For example, when data is recorded in the storage 22 by the application program, the file management unit 54, for example, decides the data characteristics such as those previously mentioned in reference to FIG. 2, in accordance with the type of application program. Alternatively, the data characteristics such as those previously mentioned in reference to FIG. 2 may be notified from the application program. Then, on the basis of the data characteristics, the file management unit 54 appends, to the data in question, for example, an identifier that designates which recording system of recording system A to recording system E of FIG. 3 should be used for recording the data to be written from thereon. Moreover, this identifier, for example, is appended to each file making up predetermined write units of data.

The file system control unit 55, for example, extracts, in file units, data that is recorded in the storage 22 by an application program, and controls the storage control unit 57 so that each of the files is recorded in a predetermined recording region. At such time, the recording regions are decided on the basis of the identifier appended to each file by the file management unit 54, and the identifier appended to each file is supplied to the storage parameter setting unit 56. Furthermore, the file system control unit 55 creates a table and so forth indicating the recording location of each file.

The storage parameter setting unit 56, for example, controls the redundancy code and write leveling and so forth corresponding to each of the files supplied from an application program to the storage control unit 57 via the file system control unit 55. In other words, the storage parameter setting unit 56 designates the recording system for each region on the basis of the aforementioned parameters. Then, the storage parameter setting unit 56 performs processing relating to control of the redundancy code calculation system and control of write leveling and so forth when file data is actually written to or read from the storage 22 by the storage control unit 57.

Moreover, control is performed so that "FS metadata" file data that is output from the file system control unit 55 is recorded in a recording region in which recording system A is ordinarily applied.

The storage control unit 57 initializes each recording region of a logical device (for example, storage 22) connected to the electronic device 10. Furthermore, the storage control unit 57 performs writing of file data to the storage 22, or performs reading, and, for example, is configured as a function block corresponding to a driver so to speak.

The storage parameter management unit 58, for example, updates information such as the remaining capacity of each recording region in the storage 22.

Next, an example of storage format processing performed by the electronic device 10 is described with reference to the flowchart of FIG. 5.

In step S21, the initial parameter setting unit 51, for example, analyzes the types and characteristics of data on the basis of the table depicted in FIG. 2.

In step S22, the initial parameter setting unit 51 decides the number of recording regions and the recording systems. For example, five recording regions that employ recording system A to recording system E such as those depicted in FIG. 3 are decided.

Figure 6:
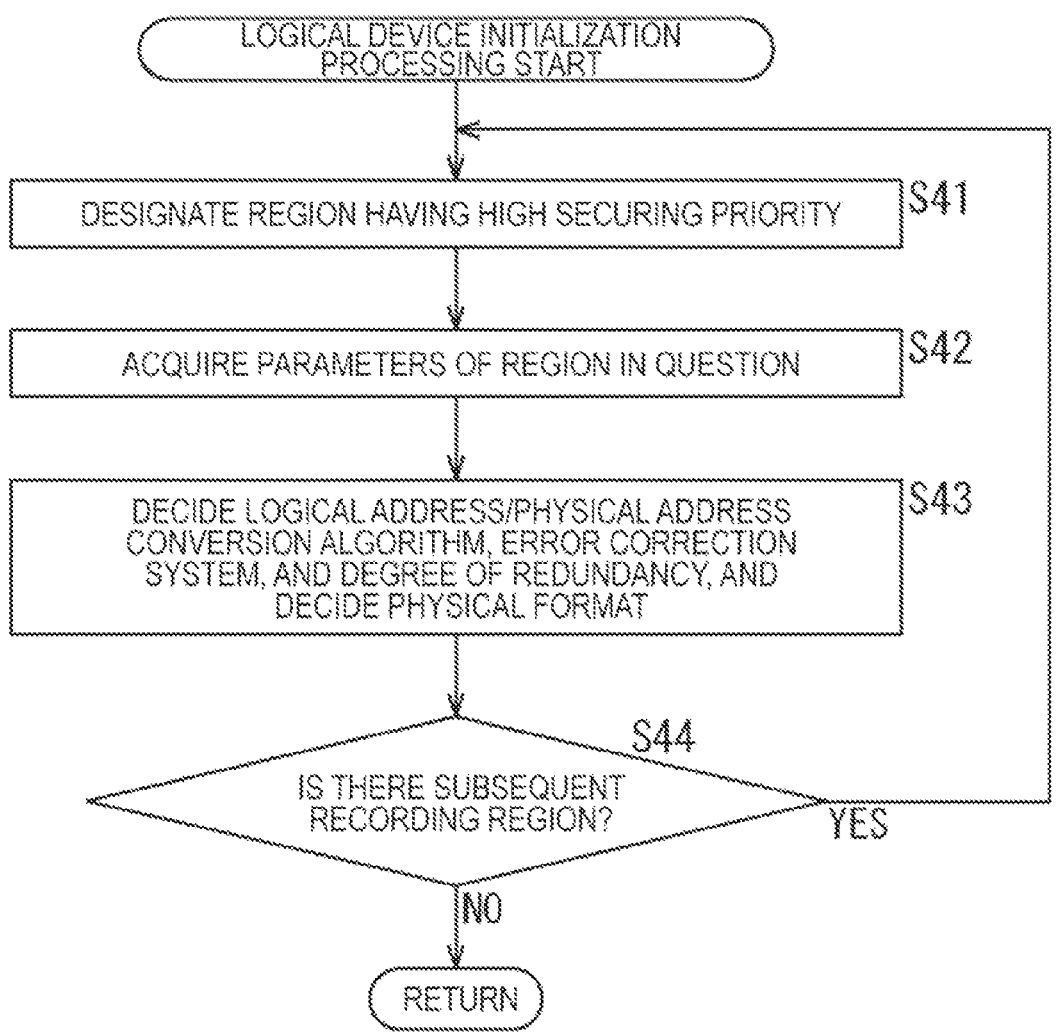
FIG. 6 is a flowchart illustrating an example of logical device initialization processing.

In step S23, the logical device initialization unit 53 and the storage control unit 57 execute logical device initialization processing, which is described hereafter with reference to FIG. 6.

Figure 5:
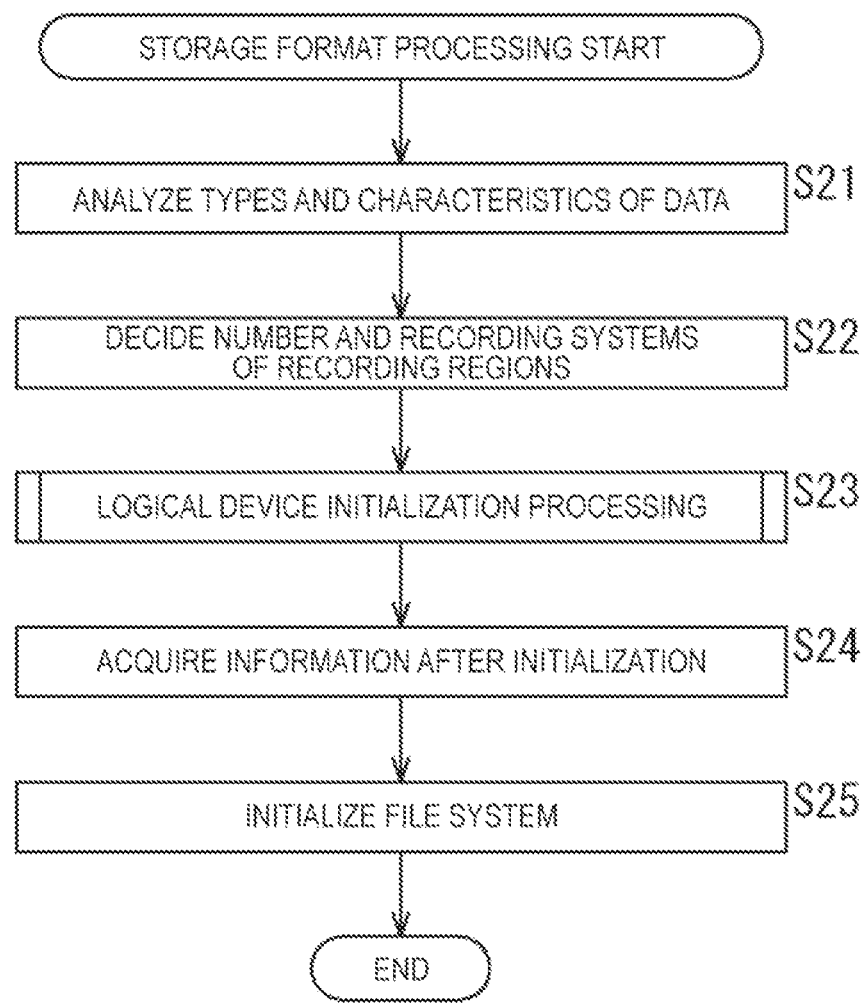
FIG. 5 is a flowchart illustrating an example of storage format processing.

Here, a detailed example of the logical device initialization processing of step S23 of FIG. 5 is described with reference to the flowchart of FIG. 6.

In step S41, the logical device initialization unit 53 designates the recording region for data having the highest securing priority from among the plurality of recording regions decided by means of the processing of step S22. For example, in the case of the example of FIG. 2, the securing priority of the "FS metadata" is the highest, and therefore the recording region employing recording system A of FIG. 3 is designated as the recording region for data having the highest securing priority from among the plurality of recording regions decided by means of the processing of step S22.

In step S42, the logical device initialization unit 53 acquires the parameters of the region (the region designated by means of the processing of step S41). At such time, as described above, for example, an identifier that distinguishes between SLC/MLC, the error correction capability strength, and the degree of write leveling redundancy and so forth are acquired as parameters.

In step S43, the storage control unit 57 decides the logical address/physical address conversion algorithm, the error correction system, and the degree of write leveling redundancy for the region in question, on the basis of the parameters acquired by means of the processing of step S42. Then, the logical device initialization unit 53 decides the physical format for the region in question, on the basis of the logical address/physical address conversion algorithm, the error correction system, and the degree of write leveling redundancy.

In other words, the error correction capability strength and the degree of write leveling redundancy are designated between SLC/MLC on the basis of the parameters acquired by means of the processing of step S42, and the logical address/physical address conversion algorithm is thereby decided. Furthermore, the error correction capability strength is designated on the basis of the parameters acquired by means of the processing of step S42, and the error correction system is thereby decided. In addition, the degree of write leveling redundancy is designated on the basis of the parameters acquired by means of the processing of step S42, and the degree of write leveling redundancy is thereby decided.

Thus, the physical format for the region is decided. In other words, when predetermined recording units of logical data are recorded, the required physical region is decided with the error correction system and the degree of write leveling redundancy being taken into consideration. Furthermore, the storage capacity required by the region is thus determined, and initialization of the logical device corresponding to the region is performed.

In step S44, the logical device initialization unit 53 determines whether or not there is a subsequent recording region. For example, in this case, initialization of the logical devices corresponding to the recording regions of recording system B to recording system E has not yet been performed, and therefore, in step S44, it is determined that there is a subsequent recording region.

In step S44, if it is determined that there is a subsequent recording region, the processing returns to step S41, and the processing thereafter is repeatedly executed.

However, for example, if the initialization of the logical devices corresponding to each of the recording regions of recording system A to recording system E has already been performed, in step S44, it is determined that there is no subsequent recording region, and the processing ends.

Logical device initialization processing is performed in this way.

Returning to FIG. 5, after the processing of step S23, the processing advances to step S24.

In step S24, the initial parameter setting unit 51 acquires information after the initialization that accompanies the processing of step S23. The information acquired here is information required to initialize the file system.

In step S25, the file system initialization unit 52 performs partitioning of the storage 22 on the basis of the information acquired by means of the processing of step S24, and initializes the file system.

Storage format processing is executed in this way.

Figure 7:
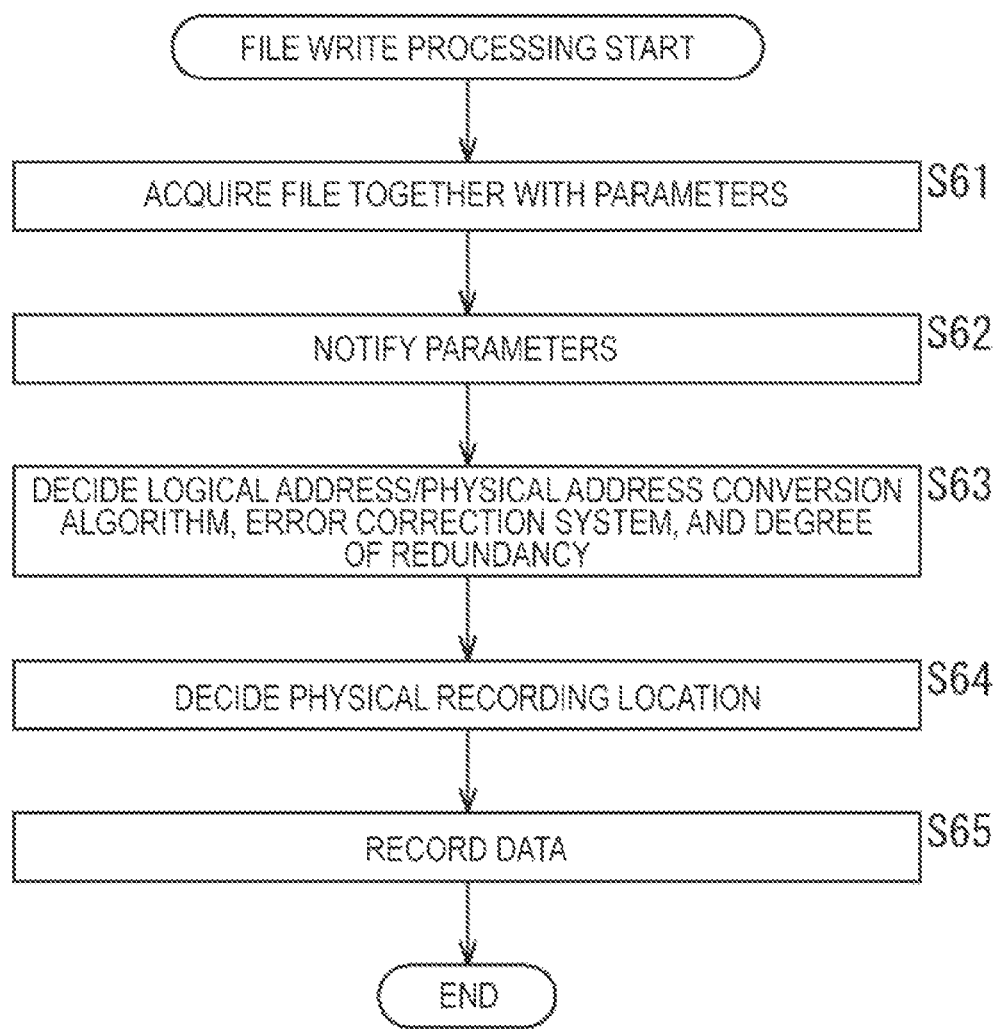
FIG. 7 is a flowchart illustrating an example of file write processing.

Next, an example of file write processing performed by the electronic device 10 is described with reference to the flowchart of FIG. 7.

In step S61, the file system control unit 55 acquires, from an application program, a file making up predetermined write units of data that is output as a write request, and acquires parameters corresponding to the data from the file management unit 54.

In step S62, the storage parameter setting unit 56 notifies the parameters acquired by means of the processing of step S61, to the storage control unit 57.

In step S63, the storage parameter setting unit 56 decides the logical address/physical address conversion algorithm, the error correction system, and the degree of write leveling redundancy on the basis of the parameters notified by means of the processing of step S62.

In step S64, the storage control unit 57 designates the physical recording location in the recording medium constituting the storage 22, on the basis of the processing result of step S63.

In step S65, the storage control unit 57 records the data corresponding to the file acquired by means of the processing of step S61, in the physical recording location designated by means of the processing of step S64.

The file write processing is executed this way.

Figure 8:
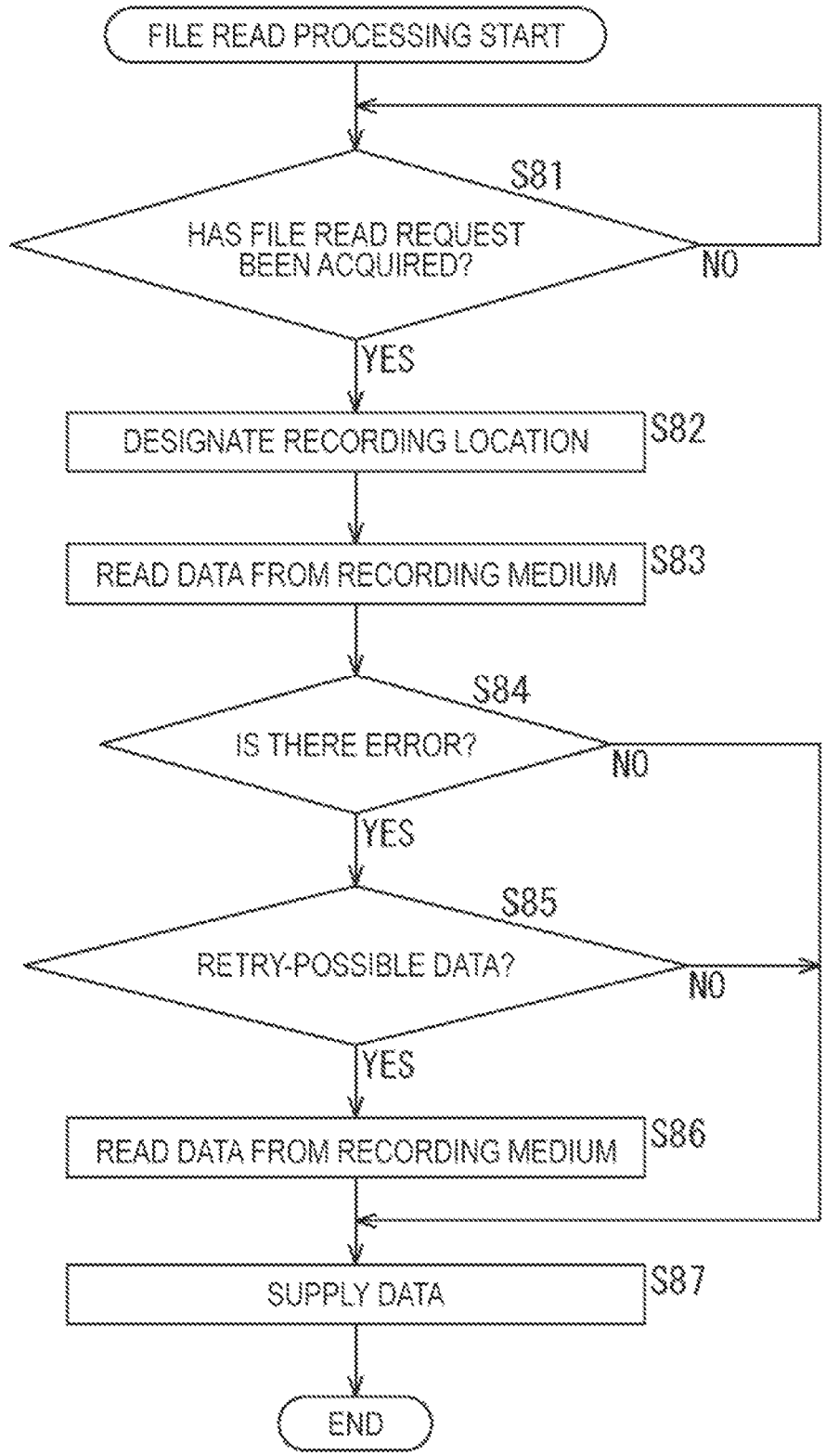
FIG. 8 is a flowchart illustrating an example of file read processing.

Next, an example of file read processing performed by the electronic device 10 is described with reference to the flowchart of FIG. 8.

In step S81, the file system control unit 55 determines whether or not there has been a file read request from an application program, and waits until it is determined that there has been a read request.

In step S81, if it is determined that there has been a file read request from an application program, the processing advances to step S82.

In step S82, the file system control unit 55 designates a recording location (for example, a logical address and so forth) for data making up the file for which there has been a read request. Moreover, the logical address/physical address conversion algorithm, the error correction system, and the degree of write leveling redundancy for the data are also thereby designated.

In step S83, the storage control unit 57 reads, from the recording medium, data that is recorded in the recording location designated by means of the processing of step S82.

In step S84, the storage control unit 57 determines whether or not there is an error in the data that has been read by means of the processing of step S83. In step S84, if it is determined that there is an error, the processing advances to step S85.

In step S85, the storage control unit 57 determines whether or not the data is data with which a retry is possible.

In step S85, if it is determined that the data is data with which a retry is possible, the processing advances to step S86.

In step S86, the storage control unit 57 once again reads, from the recording medium, the data that is recorded in the recording location designated by means of the processing of step S82.

Moreover, if it is determined by means of the processing of step S84 that there is no error, the processing of step S85 and step S86 is skipped. Furthermore, in step S85, if it is determined that the data is not data with which a retry is possible, the processing of step S86 is skipped.

After the processing of step S86, in step S87, the file system control unit 55 supplies the file made up by the data that is read by means of the processing of step S83 or step S86, to the application program that issued the read request.

Moreover, the processing of step S87 may be executed before the processing of step S84 to step S86, and the processing of step S84 to step S86 may be executed by means of control performed by the application program.

Furthermore, here, an example in which a retry (read once again from the recording medium) is performed once has been described; however, for example, a predetermined number of retries may be performed until data having no errors is read.

The file read processing is executed in this way.

FIG. 3 has been described above as an example of the parameters of recording systems; however, the parameters of recording systems different from those depicted in FIG. 3 may be used. For example, there may be more or fewer types of recording systems.

Alternatively, for example, on the basis of the characteristics of the data depicted in FIG. 2, parameters may be generated with predetermined calculations being performed and so forth and recording systems being automatically selected and so forth. In addition, for example, when the types of data are assigned, the characteristics of the data assumed from those types may be automatically designated.

Incidentally, in the example of FIG. 1, an example in which the CPU 21, the storage 22, and the main memory 23 are connected via the bus 31 was described as the configuration of the electronic device 10; however, the present technology can be applied in configurations other than this.

Figure 9:
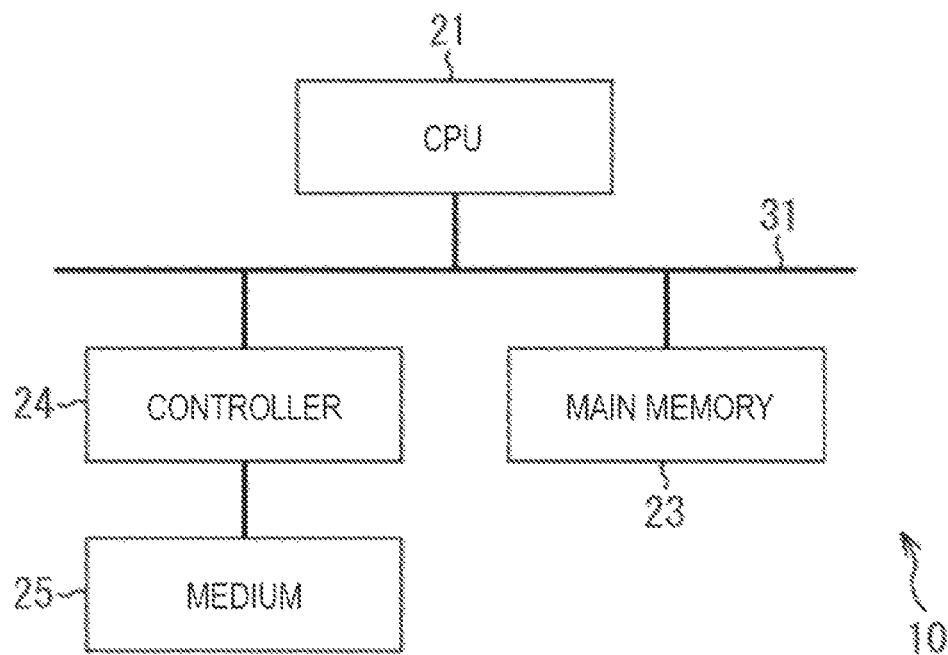
FIG. 9 is a block diagram depicting another exemplary configuration of an electronic device in which the present technology has been applied.

FIG. 9 is a block diagram depicting another exemplary configuration of an electronic device 10. In this example, in an electronic device 10, a CPU 21, main memory 23, and a controller 24 are connected via a bus 31. Then, a medium 25 is connected to the controller 24. For example, the medium 25 is configured as a recording medium such as a magnetic disk, and the controller 24 is a function block specifically for performing the writing of data to the medium 25 and the reading of data from the medium 25.

In the case of the example of FIG. 9, for example, FIG. 4 may be a block diagram depicting an exemplary functional configuration of software such as a program that is executed by the controller 24. Alternatively, a function block of part of FIG. 4 may be realized as software and so forth such as a program that is executed by the CPU 21, and other function blocks may be realized as software and so forth such as programs that are executed by the controller 24.

Figure 10:
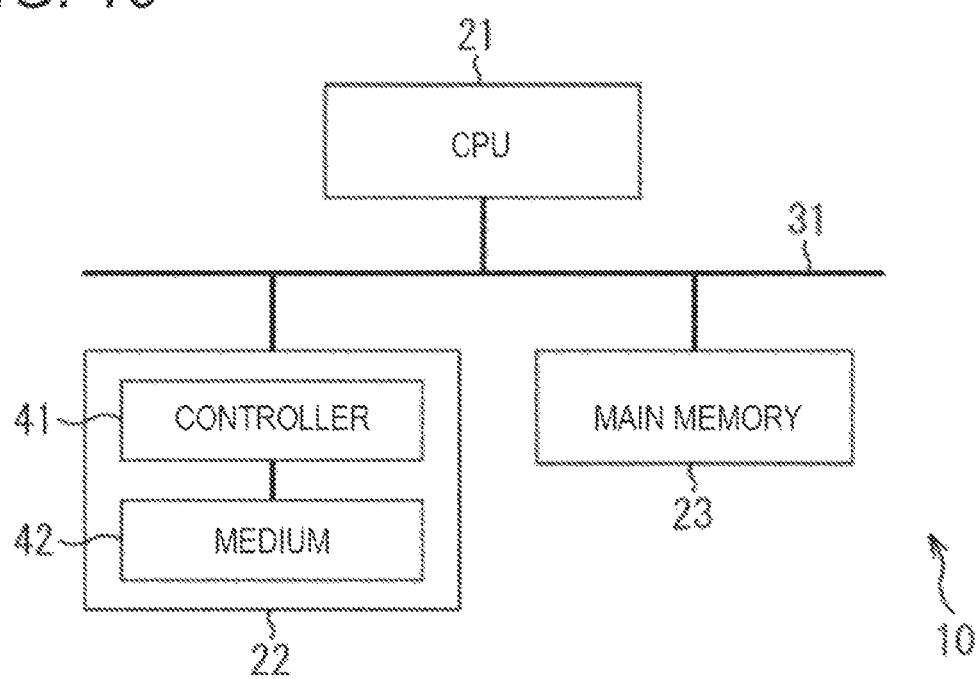
FIG. 10 is a block diagram depicting yet another exemplary configuration of an electronic device in which the present technology has been applied.

Furthermore, FIG. 10 is a block diagram depicting yet another exemplary configuration of an electronic device 10. In this example, as in the case of FIG. 1, in an electronic device 10, a CPU 21, storage 22, and main memory 23 are connected via a bus 31. However, in the example of FIG. 10, the storage 22 is configured from a controller 41 and a medium 42.

In the case of the example of FIG. 10, for example, FIG. 4 may be a block diagram depicting an exemplary functional configuration of software such as a program that is executed by the controller 41. Alternatively, a function block of part of FIG. 4 may be realized as software and so forth such as a program that is executed by the CPU 21, and other function blocks may be realized as software and so forth such as programs that are executed by the controller 41.

Moreover, the aforementioned series of processing can be executed by hardware, or can be executed by software. In the case where the aforementioned series of processing is executed by software, a program constituting that software is installed from a network or a recording medium onto a computer that is incorporated in dedicated hardware, or a general-purpose personal computer 700 and so forth such as that depicted in FIG. 11 for example that can execute various types of functions by installing various types of programs.

Figure 11:
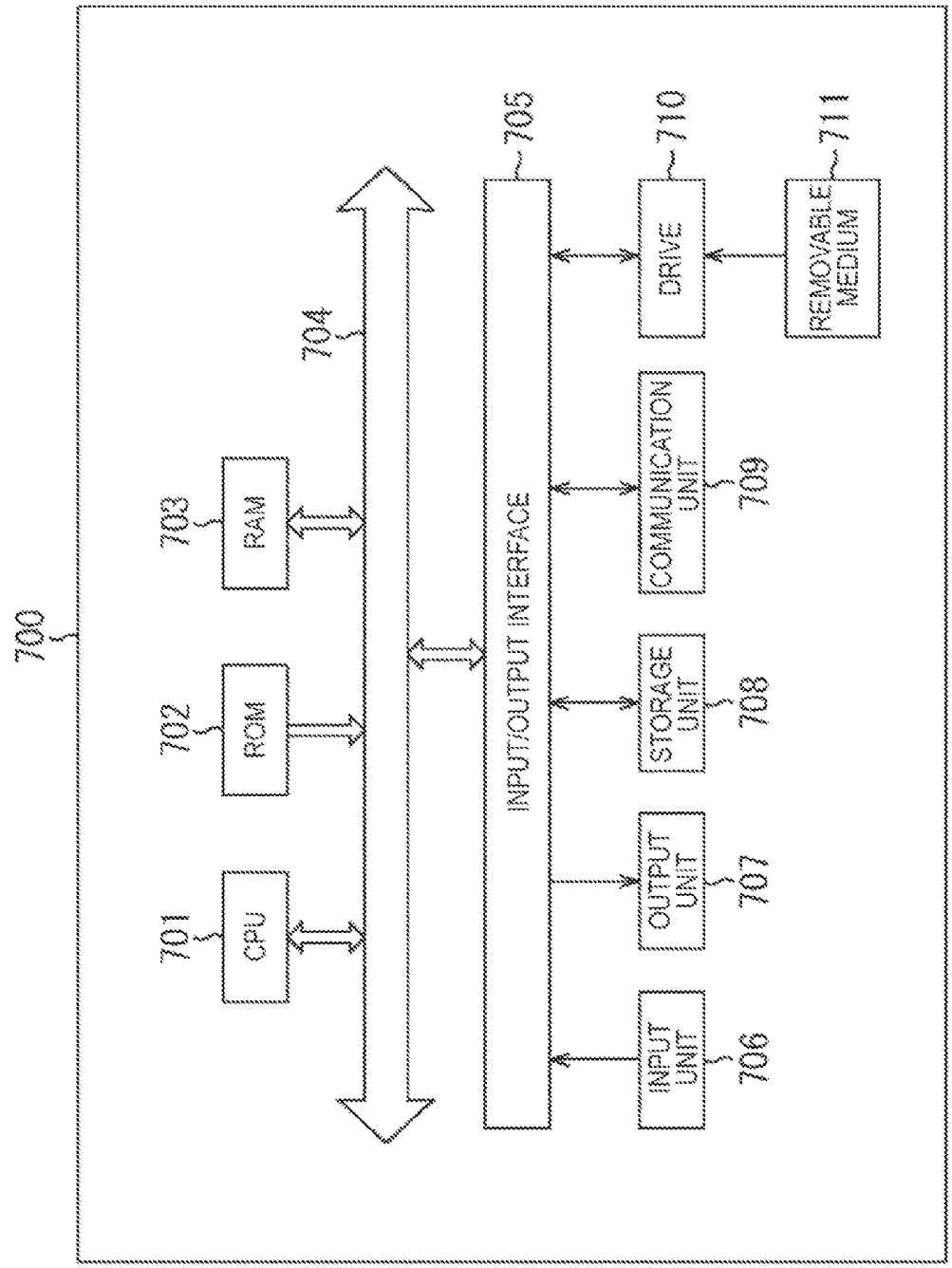
FIG. 11 is a block diagram depicting an exemplary configuration of a personal computer.

In FIG. 11, a CPU (central processing unit) 701 executes various types of processing in accordance with a program stored in ROM (read-only memory) 702, or a program loaded in RAM (random-access memory) 703 from a storage unit 708. The data and so forth required for the CPU 701 to execute the various types of processing is also stored, as appropriate, in the RAM 703.

The CPU 701, the ROM 702, and the RAM 703 are connected to each other via a bus 704. An input/output interface 705 is also connected to this bus 704.

An input unit 706 constituted by a keyboard or a mouse and so forth, an output unit 707 constituted by a display constituted by an LCD (liquid crystal display) and so forth, or constituted by a speaker and so forth, the storage unit 708 configured from a hard disk and so forth, and a communication unit 709 configured from a modem or a network interface card such as a LAN card are connected to the input/output interface 705. The communication unit 709 performs communication processing via a network such as the Internet.

Furthermore, a drive 710 is connected to the input/output interface 705 as required, a removable medium 711 such as a magnetic disk, an optical disc, a magneto-optical disc, or semiconductor memory is attached to the input/output interface 705 as appropriate, and a computer program read therefrom is installed in the storage unit 708 as required.

In the case the aforementioned series of processing is executed by means of software, a program constituting that software is installed from a network such as the Internet, or a recording medium constituted by the removable medium 711 and so forth.

Moreover, this recording medium may not only be configured from the removable medium 711 such as a magnetic disk (such as a floppy disk (registered trademark)), an optical disc (such as a CD-ROM (compact disc-read only memory), or a DVD (digital versatile disc)), a magneto-optical disc (such as an MD (MiniDisc) (registered trademark)), or semiconductor memory and so forth having a program recorded thereon, which is distributed for delivering a program to users, separate from the device main body, as depicted in FIG. 11, and may also be configured from the ROM 702 having a program recorded thereon, or a hard disk included in the storage unit 708, which is distributed to users while having been incorporated in advance into the device main body.

Moreover, the aforementioned series of processing in the present description naturally includes processing that is performed in a time-sequential manner in the order described, but the aforementioned series of processing does not necessarily have to be processed in a time-sequential manner, and also includes processing that is executed in a parallel or discrete manner.

Furthermore, the embodiments of the present technology are not restricted to the aforementioned embodiments, and various alterations are possible within a scope that does not deviate from the purpose of the present technology.

Moreover, the present technology can also adopt a configuration such as the following.

(1) An information processing device including:
a recording system decision unit that, on the basis of characteristics of data to be recorded in a recording medium, generates a plurality of recording regions of a logical device configured from the recording medium, and also decides recording systems to be applied in each of the recording regions; and
a logical device initialization unit that initializes each of the recording regions of the logical device on the basis of the decided recording systems.

(2) The image processing device according to (1), wherein the characteristics of data recorded in the recording medium are characteristics including a lifespan value representing the retention period of the data and an error rate representing the percentage of errors assumed to be generated when the data is read.

(3) The image processing device according to (1) or (2), wherein the recording system decision unit decides parameters which are parameters for designating recording systems to be applied in each of the recording regions, and include an identifier that distinguishes between SLC/MLC, an error correction capability strength, and a degree of write leveling redundancy.

(4) The image processing device according to any of (1) to (3), wherein the recording system decision unit generates at least one recording region for recording data for which the error rate is a value exceeding 0.

(5) The image processing device according to any of (1) to (4), wherein the logical device initialization unit initializes at least one recording region in which a recording system of the SLC (single-level cell) system is to be applied, as a region for recording metadata of a file system.

(6) An information processing method including steps in which:
a recording system decision unit generates, on the basis of characteristics of data to be recorded in a recording medium, a plurality of recording regions of a logical device configured from the recording medium, and also decides recording systems to be applied in each of the recording regions; and
a logical device initialization unit initializes each of the recording regions of the logical device on the basis of the decided recording systems.

(7) A recording medium having recorded thereon a program that causes a computer to function as an information processing device including:
a recording system decision unit that, on the basis of characteristics of data to be recorded in a recording medium, generates a plurality of recording regions of a logical device configured from the recording medium, and also decides recording systems to be applied in each of the recording regions; and
a logical device initialization unit that initializes each of the recording regions of the logical device on the basis of the decided recording systems.

(8) An information processing device including:
a recording system decision unit that, on the basis of characteristics which are characteristics of data to be recorded in a recording medium, and include a lifespan value representing the retention period of the data and an error rate representing the percentage of errors assumed to be generated when the data is read, decides a system for recording the data to the recording medium; and a recording execution unit that records the data in a recording region corresponding to the decided recording system, from among a plurality of recording regions of recording regions of the logical device.

(9) An information processing device including:

a request determination unit that determines whether or not a read request for data recorded in a recording medium has been acquired together with information representing characteristics including an error rate representing the percentage of errors assumed to be generated when the data is read;

a recording region designation unit that, in the case where it is determined that a read request for the data has been acquired, designates a recording region corresponding to characteristics of the data, from among a plurality of recording regions in the recording medium;

a read unit that reads the data from the designated recording region;

an error determination unit that determines whether or not there is an error in the data that has been read;

a retry determination unit that, in the case where it is determined that there is an error in the data that has been read, determines whether or not the recording region from which the data has been read is a recording region for which a retry is necessary when the data is read; and a reread unit that, in the case where the data has been read from a recording region for which a retry is necessary, reads the data once again from the recording region.

REFERENCE SIGNS LIST

10 Electronic device
21 CPU
22 Storage
23 Main memory
24 Controller
25 Medium
41 Controller
42 Medium
51 Initial parameter setting unit
52 File system initialization unit
53 Logical device initialization unit
54 File management unit
55 File system control unit
56 Storage parameter setting unit
57 Storage control unit
58 Storage parameter management unit

The invention claimed is:

1. An information processing device comprising:
a recording system decision unit that, based on characteristics of data to be recorded in a recording medium, generates a plurality of recording regions of a logical device configured from the recording medium, categorizes a plurality of recording systems for the recording medium, and decides one or more recording systems to be applied in each of the recording regions; and
a logical device initialization unit that initializes each of the recording regions of the logical device on the basis of the decided recording systems,
wherein the characteristics of data recorded in the recording medium are characteristics including a lifespan value representing a retention period of a data type and an error rate representing a percentage of errors assumed to be generated when the data is read, and
wherein the recording system decision unit and the logical drive initialization unit are each implemented via at least one processor.

2. The information processing device according to claim 1,
wherein the recording system decision unit decides parameters which are parameters for designating recording systems to be applied in each of the recording regions, and include an identifier that distinguishes between SLC/MLC, an error correction capability strength, and a degree of write leveling redundancy.

3. The information processing device according to claim 1,
wherein the recording system decision unit generates at least one recording region for recording data for which an error rate is a value exceeding 0.

4. The information processing device according to claim 1,
wherein the logical device initialization unit initializes at least one recording region in which a recording system of an SLC (single-level cell) system is to be applied, as a region for recording metadata of a file system.

5. An information processing method including steps in which:
a recording system decision unit generates, based on characteristics of data to be recorded in a recording medium, a plurality of recording regions of a logical device configured from the recording medium, a plurality of recording systems for the recording medium, and decides one or more recording systems to be applied in each of the recording regions; and
a logical device initialization unit initializes each of the recording regions of the logical device on the basis of the decided recording systems,
wherein the characteristics of data recorded in the recording medium are characteristics including a lifespan value representing a retention period of a data type and an error rate representing a percentage of errors assumed to be generated when the data is read.

6. A non-transitory computer-readable storage medium storing a program which, when executed by a computer, causes the computer to execute a method, the method comprising:
generating, based on characteristics of data recorded in a recording medium, a plurality of recording regions of a logical device configured from the recording medium,
categorizing a plurality of recording systems for the recoding medium,
deciding one or more recording systems to be applied in each of the recording regions; and
initializing each of the recording regions of the logical device based on the decided recording systems,
wherein the characteristics of data recorded in the recording medium are characteristics including a lifespan value representing a retention period of a data type and an error rate representing a percentage of errors assumed to be generated when the data is read.

7. An information processing device comprising:
a recording system decision unit that, based on characteristics which are characteristics of data to be recorded in a recording medium, and including a lifespan value representing the retention period of a data type and an error rate representing a percentage of errors assumed to be generated when the data is read, categorizes and decides a system for recording the data to the recording medium; and a recording execution unit that records the data in a recording region corresponding to the decided recording system, from among a plurality of recording regions of recording regions of the logical device, wherein the recording system decision unit and the recording execution unit are each implemented via at least one processor.

8. An information processing device comprising:

a request determination unit that determines whether or not a read request for data recorded in a recording medium has been acquired together with information representing characteristics including an error rate representing a percentage of errors assumed to be generated when the data is read;

a recording region designation unit that, where it is determined that a read request for the data has been acquired, designates a recording region corresponding to characteristics of the data, from among a plurality of recording regions in the recording medium;

a read unit that reads the data from the designated recording region;

an error determination unit that determines whether or not there is an error in the data that has been read;

a retry determination unit that, in the case where it is determined that there is an error in the data that has been read, determines whether or not the recording region from which the data has been read is a recording region for which a retry is necessary when the data is read; and a reread unit that, in the case where the data has been read from a recording region for which a retry is necessary, reads the data once again from the recording region, wherein the characteristics of the data include a lifespan value representing a retention period of a data type, and wherein the request determination unit, the recording region designation unit, the read unit, the error determination unit, the retry determination unit and the reread unit are each implemented via at least one processor.

9. The information processing device according to claim 1, wherein the characteristics of data comprises securing priority, required region, rewrite count, write data amount, life span, error rate, read speed, write speed, write units, write-once writing, rewritable writing.

10. The information processing device according to claim 1, wherein the logical device initialization unit partitions the recording medium based on characteristics of the data to be recorded.

11. The information processing device according to claim 1, wherein the recording regions are categorized based on efficiency.

* * * * *